Feb. 14, 1950     A. A. MARKSON     2,497,783
RADIATION PYROMETER

Filed July 24, 1945     5 Sheets-Sheet 1

Alfred A. Markson
INVENTOR

BY Gerald B. Tjoflat
HIS ATTORNEY

Feb. 14, 1950

A. A. MARKSON 2,497,783

RADIATION PYROMETER

Filed July 24, 1945

Alfred A. Markson
INVENTOR

BY Gerald B. Tjoflat
His ATTORNEY

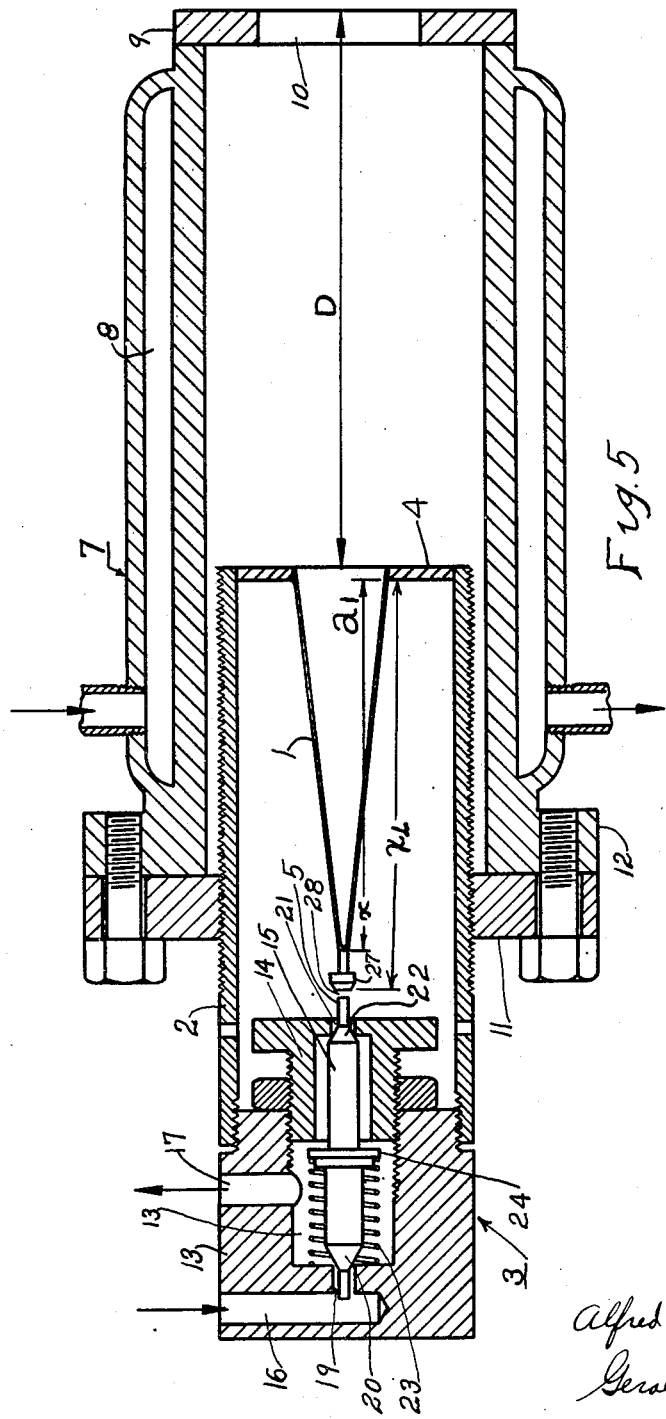

Feb. 14, 1950      A. A. MARKSON      2,497,783
RADIATION PYROMETER

Filed July 24, 1945      5 Sheets-Sheet 4

Alfred A. Markson
INVENTOR
BY Gerald B. Tjoflat
HIS ATTORNEY

Patented Feb. 14, 1950

2,497,783

UNITED STATES PATENT OFFICE 2,497,783

RADIATION PYROMETER

Alfred A. Markson, Mount Lebanon, Pa., assignor, by mesne assignments, to Hagan Corporation, Pittsburgh, Pa., a corporation of Pennsylvania Application July 24, 1945, Serial No. 606,724

23 Claims. (Cl. 297—11)

This invention relates to differential expansion devices and, more particularly, to devices where differential expansion is effected by radiant energy and not by ambient temperature or temperature such as would be measured by means of ordinary thermometer.

This application is a continuation in part application of my application Serial No. 519,690, filed January 25, 1944, for Radiation pyrometers, now abandoned.

An object of this invention is to provide a radiation pyrometer which is substantially insensitive to ambient temperature or to temperatures such as would be measured by a thermometer and which is sensitive only to radiant energy.

Another object of the invention is to provide a radiation pyrometer whose response to radiant energy is substantially a linear function of total radiant energy received thereby.

A still further object of the invention is to provide a radiation pyrometer which is of rugged, sturdy metal construction designed to operate on the differential expansion principal and which is responsive to radiant energy but not to ambient temperature.

A still further object of the invention is to provide a radiation pyrometer which is adaptable to provide direct readings of temperature, or to operate actuated devices of the type such as valves, pressure sending valves, electric switches, such as variable impedances and inductances, or any device used as a control or indicating device, or both, and be actuated by and in accordance with the total radiant energy received by the radiation sensitive element of the pyrometer.

Other objects of the invention, as well as the principles of its design and operation, will, in part, be apparent, and will, in part, be obvious, from the following description taken in conjunction with the accompanying drawings, in which.

Figure 13:
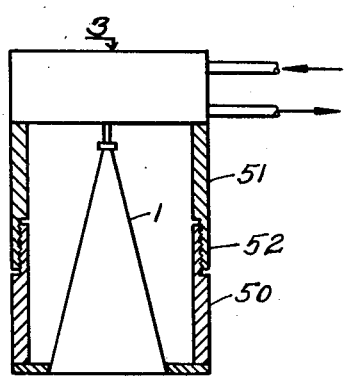
Figure 14:
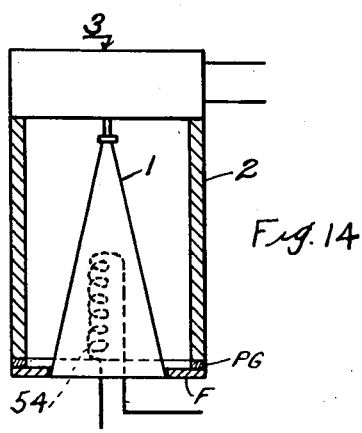
Figure 15:
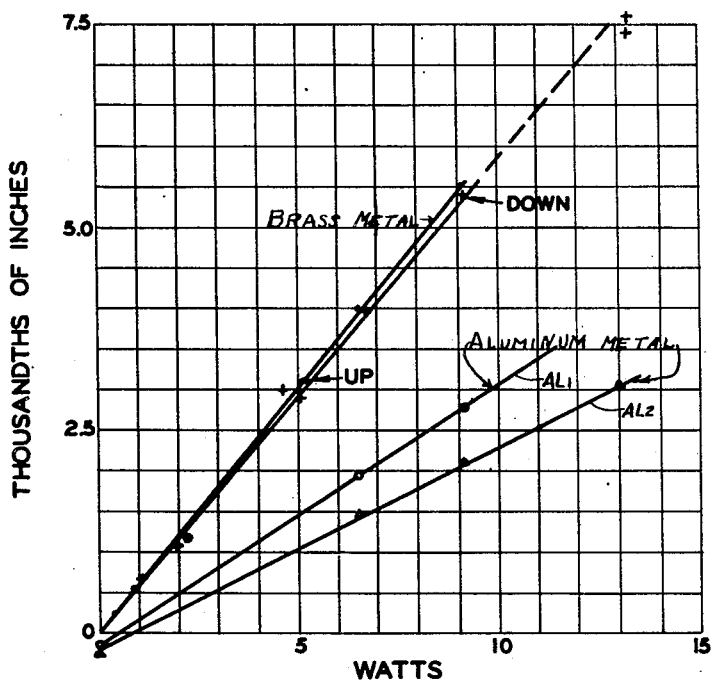
Figure 16:
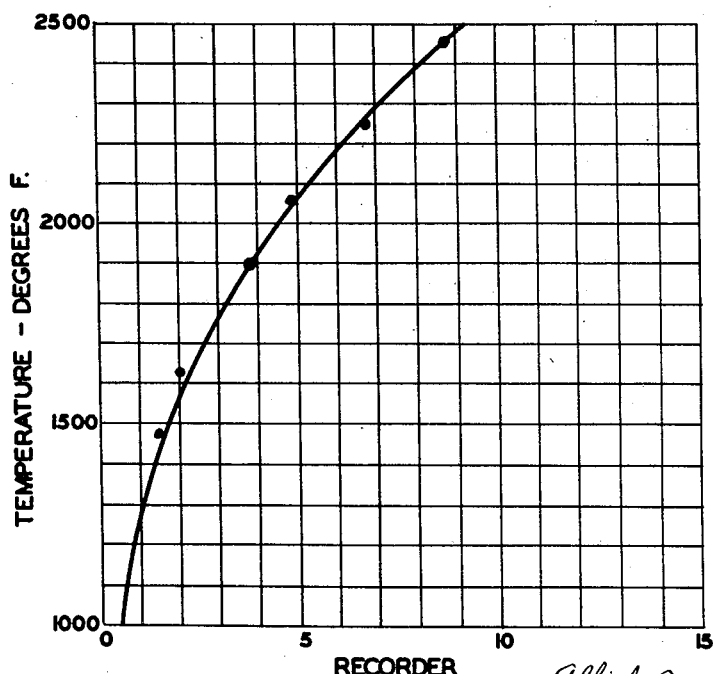

Fig. 5 is a more or less detailed view in the longitudinal section of one of the preferred forms of the invention, said form being particularly adapted for mounting in a sight-hole in a furnace wall and embodying a control element adapted to send out strong control forces over a wide range of values, which forces are also an indication of temperature as measured by the radiant energy received by the radiant energy receiving element of the pyrometer;

Figs. 6 to 12, inclusive, are more or less diagrammatic views of the radiation pyrometer provided with different forms of actuated devices, that is, devices actuated by the radiation responsive element of the pyrometer;

Fig. 13 is a view partly in section of a pyrometer in which the support for the radiation responsive element is composed of a plurality of sections of metal, each having different temperature coefficients of expansion;

Fig. 14 is a more or less diagrammatic view of a pyrometer embodying the invention adapted for measuring electric energy;

Fig. 15 is a graph illustrating the relationship of elongation of several radiation responsive elements of different metals and the watt input to a resistor in an arrangement such as shown in Fig. 14; and Fig. 16 is a graph showing a theoretical temperature scale of well known temperature recorder having points spotted thereon illustrating how a device embodying the invention compares in accuracy with that of said recorder.

Throughout the drawings and specifications, like reference characters indicate like parts.

The form of radiation pyrometer illustrated in Fig. 5 comprises a hollow radiation responsive element 1 which is open at one end and closed at the other, a support 2 within which element 1 is disposed and an actuated device or means 3 carried by the support adjacent to the closed end of element 1.

The open end of element 1 is secured to support 2 by means of an annular flange 4. Flange 4 may be integral with element 1 or provided as a separate element, in which case it is appropriately secured to support 2 and element 1 as by being brazed, soldered or welded thereto.

Element 1, support 2 and actuated means 3 are made of metal whose temperature coefficients of expansion are such that the relative positions of the closed end of element 1 and the adjacent part or element of the actuated device as indicated at 5 and which is to be actuated by element 1, remain fixed for any value of ambient temperature to which the several parts or elements just described may be subjected to. In other words, there will not be any differential expansion between element 1, on the one hand, and the actuated means 3, on the other, when these members are subjected to equal ambient temperatures.

As may be seen in Fig. 5, element 1 is hollow and its fixed end or base is open so that radiant energy may be directed upon its inner surface. Radiant energy so received is shielded from support 2 by element 1, consequently only the temperature produced by the radiant energy is operative to effect changes in length of element 1 with respect to support 2, which changes in length as will be shown later herein are substantially linearly proportional to the total radiant energy received on the inner surface of element 1.

When the pyrometer is to be mounted in an opening or sight-hole in the wall of a furnace whose temperatures are high, i. e., a metallurgical furnace, such as an open-hearth, the pyrometer may be mounted in a frame or housing 7 having a jacket 8 through which a cooling fluid, water for example, may be circulated. The end of housing 7 nearest the spot on which the pyrometer is to be sighted may be provided with a removable plate 9 having a sight opening 10 therein. The diameter of opening 10 is so selected as will produce the desired cone size of radiant energy directed on the inner surface of element 1. The size or angle of this cone of radiant energy is also determined by the relative distance D between the opening at the base of element 1 and opening 10.

In order to provide for adjustment of distance D, the pyrometer may be provided with means whereby it may be shifted longitudinally of jacket 7 as shown in Fig. 5. This may be accomplished by threading the external surface of support 2 so that it may be threaded into a plate 11 secured to a flange 12 on housing 7. It is preferred that the area of contact between support 2 and plate 11 be relatively small so that the rate of flow of heat by conduction to or from support 2 may be predetermined not to adversely affect the operation of the pyrometer.

As will be obvious from other views of the drawings and subsequent portions of the specification, the actuated means 3 may take various forms. The form shown in Fig. 5 is a pressure sending valve, that is, a valve which will transmit controlled pressures into a sending line where the pressures may vary over any desired range say, i. e., from atmospheric pressure to a maximum desired pressure such as 60 or 100 pounds per square inch more or less, and which sending pressures may be utilized when measured by a gauge to give direct or visual indications of temperature as measured by the total radiation received on the inner surface of element 1, or which may be utilized to effect control of a regulator, such as indicated diagrammatically in Fig. 4, or which may be utilized to effect both control and indication.

Figure 2:
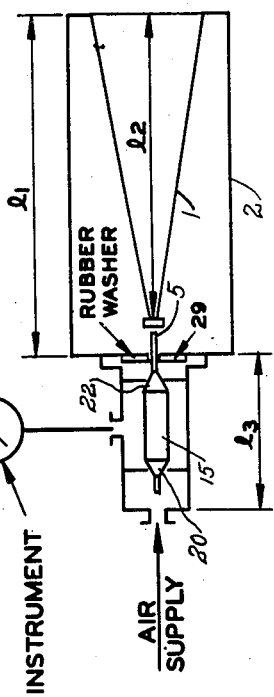
Fig. 2 is a diagrammatic illustration of one form of radiation pyrometer arranged and constructed in accordance with the invention.

Actuated means 3 as shown in Fig. 5 and also as indicated diagrammatically in Fig. 2, comprises a valve body 13 having a chamber 13' therein, which chamber is formed partly within body 3 and partly within a hollow threaded member 14, and a valve 15. The valve body is provided with an inlet passageway 16 to which a source of fluid pressure, such as compressed air, may be connected, this pressure being of a constant value, and a pressure sending port 17. The source of supply of compressed air should be clean and free of foreign substances if the best operation of the pyrometer is to be obtained.

Pressure fluid enters chamber 13' from supply port 16 through a valve opening 19. Opening 19 is controlled by a tapered surface 20 formed at one end of valve element 15. An exhaust port 21 is provided in member 14 and this port is controlled by a tapered surface 22 formed on the opposite end of valve element 15. Valve element 15 may be urged towards a position in which port 21 is closed and inlet port 19 open by means of a compression spring 23 disposed to bear between a wall of chamber 13' and a flange 24 carried by and secured to valve element 15.

When valve element 15 is in the position shown in Fig. 5, the exhaust port 21 is closed and the inlet port 19 is open whereby the maximum pressure is developed in chamber 13' and delivered to and through sending port 17. As valve element 15 is moved by element 1 in a direction such as will ultimately close port 19, pressure will escape through exhaust port 21 at a throttled rate depending upon the extent of the opening between surface 22 and the seat of port 21, and pressure medium will flow from port 16 through port 19 into chamber 13' at a throttled rate depending upon the relative amount of opening between surface 20 and the seat of port 19. Thus, the pressure developed in chamber 13' is dependent upon the relative throttling taking place at the inlet and exhaust ports. Therefore, as valve element 15 is moved towards the position in which the inlet port 19 is ultimately closed, the pressure developed in chamber 13' will vary by incrementally small values ranging from minimum pressure when the inlet port is closed to maximum pressure when the exhaust port is closed. The range of pressure between minimum and maximum may be any amount desired as determined by design. In practical applications in which this device has been employed, this range of pressure has been 60 or less pounds per square inch.

Radiation responsive element 1 and its support 2 are made of metal so selected with reference to temperature coefficients of expansion that each undergoes the same relative change in length in response to ambient temperature, as distinguished from the temperature developed in element 1 by radiant energy. As shown in Fig. 5, element 1 is hollow over a length (X) and has a solid portion 27 disposed to engage part 5 of valve element 15. Where portion 27 is of the same metal as the hollow portion, the total length of element 1, from the standpoint of ambient temperature, is $(X_1)$.

In the structure of Fig. 5 the length of support 2 is greater than $(X_1)$ but this difference in length is compensated by making part 14 of the valve body of the same metal as that of the support and so mounting the means 3 that the length of part 14 extending towards the adjacent end of element 1 is equal to the difference between the length of the support and element 1 save for the slight gap 28 between part 5 and portion 27, the gap being provided in the adjustment of the device. This compensation results because the total change in length of support 2 in one direction is offset by the change in length of valve part 14 in the opposite direction.

Thermal element 1 is preferably made of thin metal, and it is desired to use a metal which is as thin as the strength requirements permit. To have maximum strength, I prefer to make element 1 in the shape of a cone. In practice, I have made the cone from sheet metal as thin as 0.003 inch in thickness. A thin walled cone will heat quickly and have quick response to radiant energy. The angle α of cone 1 is important but not critical. I prefer that the angle be about 12°, and not more than 30°. Cone angles greater than 30° make for poor sensitivity as the mass of metal at the base or mouth of the cone results in too rapid heat loss to the support. The cone angle may be less than 12°, but in practice ought not be less than about 9°. The ratio of length of cone to diameter of its mouth is preferably of the order 6:1 to 2.5:1.

Support 2 should have a substantially heavy wall thickness, and I prefer that the thickness of the wall be at least twenty times the thickness of the metal of element 1. The thickness of the wall of support 2 ought not be less than 0.06 inch. However, a still heavier wall is preferable and I have found that good results are obtained with a wall thickness of ¼ inch.

When support 2 is made with a heavy wall, it has high heat storage capacity and high thermal inertia, which tends to prevent temperature changes in the pyrometer attributable to transient ambient temperature conditions. A heavy walled support also aids in the dissipation of heat from element 1.

Element 1 loses heat by conduction to support 2 at the points where the cone is attached to the support. It also loses heat by convection and radiation across the space between the body of element 1 and the inner surface of the support.

I may make the element 1 of aluminum, brass, bronze, copper or other suitable metal, which has a high temperature coefficient of expansion. Ordinarily support 2 may be made of the same metal where the particular design of pyrometer requires it. In any event, the thermal coefficients of expansion of the metals of which support 2 and element 1 are made, should be such that the relative changes in length from ambient temperature results in no relative movement between the free end of element 1 and the actuated means carried by the support.

As stated above, I prefer that support 2 be made of a metal having high heat storage capacity and high thermal conductivity. Such a metal usually has a correspondingly high thermal coefficient of expansion. The thermal element 1 may be made of such a metal also. However, a metal alloy is available having the unusual property of having a high temperature coefficient of expansion and relatively low thermal conductivity. Such an alloy would have a higher rate of responsiveness to changes in the total quantity of radiant energy received by the inner surface of element 1. According to advertisements in trade journals, an alloy of this type has an electric resistivity 60% higher than most commonly used alloys, a temperature coefficient of expansion higher than that of any other strong alloy, and a thermal conductivity only 2% of that of copper. This alloy is known by the trade-name "Chace Manganese Alloy No. 722," see the advertisement in Metals and Alloys for June 1945, by W. M. Chace Company. Thus element 1 may be made of a metal having a high temperature coefficient of expansion and high heat conductivity, the same as that of support 2, or it may be made of an alloy having a high temperature coefficient of expansion but relatively low heat conductivity.

To obtain greater efficiency of response to radiant energy, I prefer to apply a black coating to the inner surface of element 1.

When the pyrometer is adapted to actuate a valve whose exhaust port discharges towards element 1, it is desirable to employ a deflector such as a rubber or flexible washer 29 as in Fig. 2, or flexible diaphragms 30 as shown in Figs. 8 through 12 inclusive. By means of such deflectors, the issuing fluid, compressed air for example, is directed away from the thermal element thereby eliminating the cooling effect thereof, as well as that of moisture or vapor that may be entrapped therein.

When a flexible diaphragm is employed, it may be mounted on the support between it and the actuated device. These diaphragms may be completely cover the end of support 2 or only partially as conditions require. These diaphragms or flexible members may serve also as a means for transmitting changes in length of element 1 to the actuated means.

Figure 7:
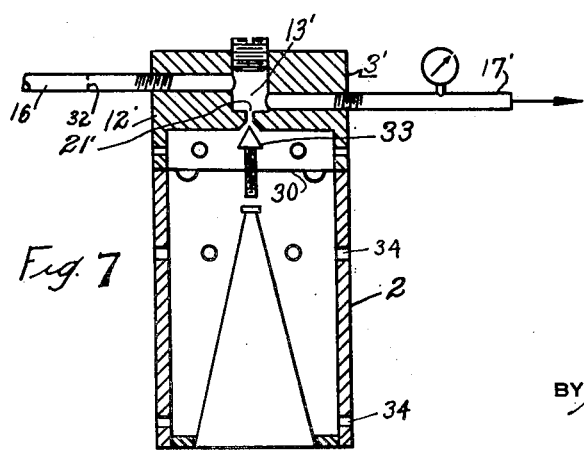

In Fig. 7 a form of pyrometer is shown having a valve 3' as the actuated means for transmitting pressure impulses of varying value from a supply source to a sending line. This valve differs from the one shown in Figs. 2 and 5 in that it has only one controlled port, i. e., exhaust port 21'. Valve 3' has a body 13' provided with an inlet 16' leading to sending chamber 13", and a sending port 17'.

In the inlet an orifice 32 is provided which operates to develop pressure drops that vary with the rates of flow through it. The rate of flow is determined by the extent to which the exhaust port is throttled by valve element 33 which is adjustably supported by the diaphragm. Minimum sending pressure occurs when the exhaust port is wide open and maximum pressure is established when the exhaust port is fully closed. For intermediate positions of valve 33, corresponding sending pressures are established.

If diaphragm 30 completely covers the end of support 2, openings 34 may be provided in the wall of the support to allow breathing of the space between element 1 and the support wall. If this space were tightly sealed, the accuracy and sensitivity of the pyrometer might be adversely affected.

The pyrometer shown in Figs. 6, and 9 to 12 inclusive, differs from the ones already described in the kind or type of actuated means employed.

Figure 6:
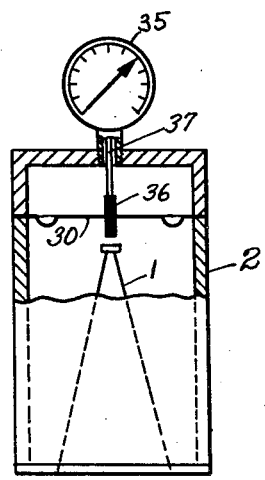

In Fig. 6 a direct reading gauge 35, of a type commonly employed for measuring small changes in length, is mounted on support 2. An adjustable screw or stud 36 threaded through diaphragm 30 is provided to transmit movement of element 1 to the "feeler" 37 of the gauge. The scale of this gauge may be calibrated in terms of temperature or other desired quantity to be measured. Support 2 is shown longer than element 1, but this difference in length is compensated by that portion of stud 36 which extends downwardly from the diaphragm towards the adjacent end of element 1.

Figure 8:
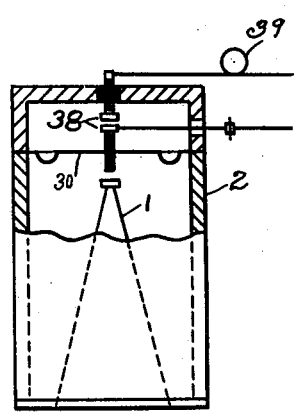

In Fig. 8 the actuated device comprises an electric switch 38 arranged to control the operation of an alarm or signal 39.

Figure 9:
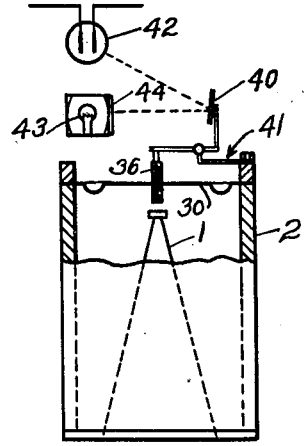

In Fig. 9 the actuating device comprises a mirror 40 pivotally mounted on a support 41 for controlling the energizing of a light sensitive device 42 by reflecting more or less of the light rays transmitted from a light source 43 through a lens 44 to the mirror 40.

Figure 10:
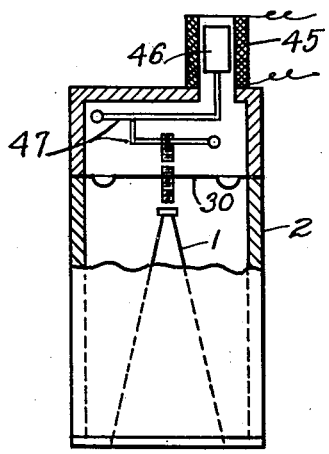

In Fig. 10, the actuated device comprises a variable resistance or impedance in the form of a coil winding 45 and a core 46 arranged to be moved in response to movement of element 1.

The core is mounted on a lever system 47 arranged to multiply, if desired, the changes in length of element 1 resulting from radiant energy.

Figure 11:
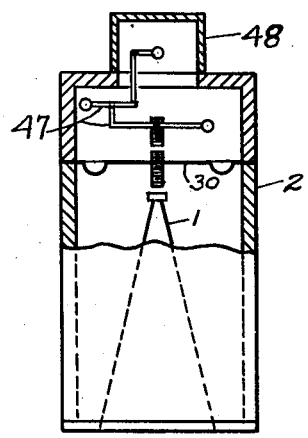
Figure 12:
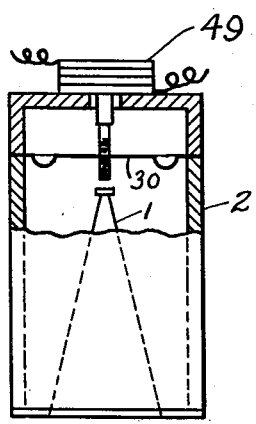

In Fig. 11, the actuated device comprises a variable condenser 48 disposed to be operated by a lever system such as that of Fig. 10; and in Fig. 12 the actuated device comprises a variable resistor 49 such as carbon pile for example.

In cases where the design of the pyrometer requires a support whose length compared to that of the element 1 is such that the difference cannot be conveniently compensated in the manner herein described, the support may be made of a plurality of sections 50 and 51 jointed together as with a screw thread joint 52 as in Fig. 13. Each section is made of a metal whose temperature coefficient of expansion is different from that of another by such an amount that there will be substantially no differential expansion resulting from ambient temperature and therefore substantially no relative movement between the closed end of element 1 and the part of the actuated means which is actuated by it and supported by the support. By providing a screw joint such as shown in the length of the support 50—51 may be adjusted until a length is obtained at which substantially no differential expansion results from ambient temperature.

In Fig. 14 I have shown the pyrometer as adapted for use as an electric energy measuring device by inserting a resistor or heating element into the hollow space of and in spaced relation from the walls of element 1 so that heat may radiate to the inner surface of element 1 in accordance with the amount of current passing through the resistance element. Element 1 will undergo changes in length proportional to the radiant energy radiated to its inner surface from the resistance. By calibrating the output of the actuated device, for example by calibrating a gauge measuring the sending pressure of a valve such as that illustrated at 3 in Fig. 5, or calibrating the direct reading gauge shown in Fig. 6, the sending pressure or the gauge readings of Fig. 6, as the case may be, will be direct measure of the energy dissipated in the resistance element. Obviously, the arrangement shown in Fig. 14 may be utilized as a current meter or it may be used as an overload relay of electric circuits, motors, etc.

The above described modifications are examples of the various forms in which the invention may be embodied and the uses to which it may be put.

Figure 4:
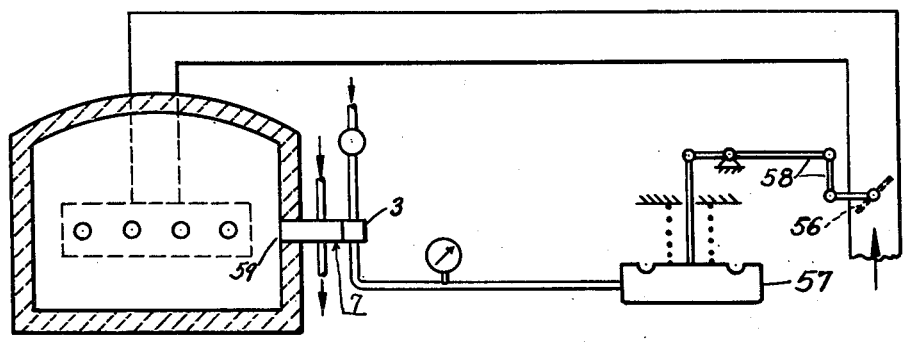
Fig. 4 is a diagrammatic illustration of the radiation pyrometer as applied to a furnace indicating how it may be employed to regulate temperature in said furnace.

Thus, in Fig. 4 one application of the device is that for regulating the delivery of fuel, such as gas to a furnace, for example an open-hearth or other metallurgical furnace, the regulation being accomplished by means of a damper or valve 56 operated by a regulator 57 through appropriate levers and linkage 58. The radiation pyrometer is shown mounted in a sight-hole or opening 59 in the wall of the furnace, the pyrometer being disposed within a housing such as that shown in Fig. 5, so that cooling water may be circulated through the jacket 9. The pyrometer operates the escapement valve or actuated device 3 to transmit pressures to regulator 57 and cause it to so position the damper or valve 56 that a desired temperature condition is maintained in the furnace.

The principles of operation of the pyrometer above described involve the theory of radiation pyrometry, which is based on the Stefan-Boltzman law. This law states that the exchange of radiation between black bodies is proportional to the difference between the fourth powers of the absolute temperatures of the bodies. The application of this principle to a pyrometer is illustrated by Fig. 1.

Figure 1:
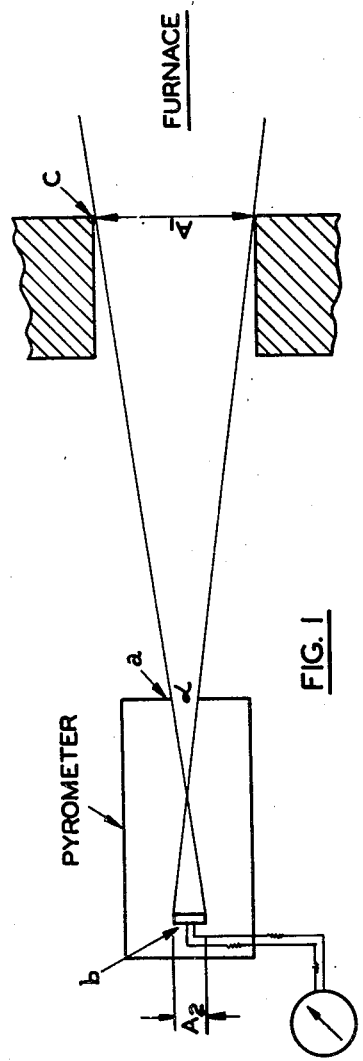
Figure 1 is a diagrammatic illustration of a radiation pyrometer which is illustrated for purposes of explaining the principles and the theory of the construction and operation of the pyrometer embodying the invention.

In Fig. 1, the pyrometer consists of a housing having a front aperture A, and circular disk B having an area of $A_2$ that is sensitive to the amount of radiation falling on it. Disk B may be any kind of a receiver of radiant energy such as a thermopile whose area for receiving radiation is fixed or constant. Looking into the furnace through the sight-hole C, it is apparent that the radiation which reaches the radiation sensitive element B must have originated within the cone described by angle $\alpha$. If the distance between element B and the aperture is relatively large compared with their diameters and if the instrument, that is the pyrometer, is placed so that the cone of radiation always passes through the sighting hole C then, as Burgess and Foote point out in the Bulletin of the Bureau of Standards for 1915, No. 12, page 191, the indications are independent of distance so that if the instrument is calibrated on a black body furnace, it may be used as a pyrometer.

A radiation receiver or radiation responsive member when used to measure the intensity of total radiation must have certain characteristics and meet certain conditions for optimum results, viz.:

1. The receiver must be responsive in the highest degree to radiation of all wave lengths, that is so say, that its absorptance for radiation must be a maximum and its reflectance a minimum.
2. The receiver should be responsive only to directed radiation or to the radiant energy falling on it and to no other type of heat transfer, such as that effected by conduction or convection. To state it in another way, if one were to attempt to use such a receiver as an ordinary thermometer, it would have no response whatever if it were a perfect receiver. In other words, the device should not shift readings or zero when the ambient temperature changes.
3. The response to radiant energy should be systematic and preferably linear, so that the readings will be accurate.
4. The response of the instrument should be a linear function of radiation as nearly as possible so that it can be used in connection with standard recorders without the necessity of special calibration of each instrument with which the radiation pyrometer is used.
5. The actual calibration of the instrument to a recorder should be capable of accomplishment in a simple and theoretically correct manner.
6. The instrument should have a quick response.

A radiation receiver or responsive element such as cone 1 meets the above requirements in the following respects:

It can be made to absorb practically all the incident energy because a smooth cone of narrow angle, such as element 1, tends to re-absorb rays by reflection which are not completely absorbed by initial impact. This phenomenon is known as the Mendenhall wedge effect. The requirements for responsiveness in a high degree to radiant energy is well met because of its cone shape. By making element 1 of cone shape, it will have great rigidity and strength even though made of very thin material. Being made of thin material the cone 1 will have a low mass of metal and consequently a very low thermal storage capacity, which is desired for quick responsiveness to changes in radiant energy. For instance, I have made cones of 0.003" thick brass and having lengths about 3" long, a base diameter of 0.75", and having a cone angle of about 12 degrees. Cones of this size and made of metal of the thickness above indicated have sufficient strength to carry a load of several pounds along the axis of the cone without distress.

Figure 3:
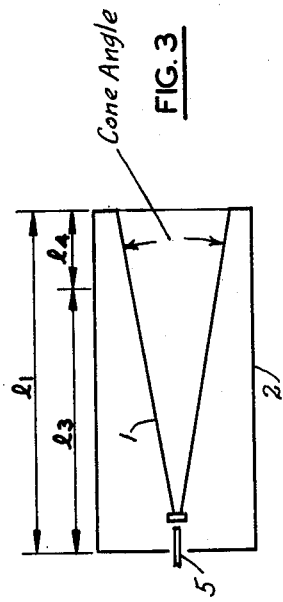
Fig. 3 is a diagrammatic illustration of a modified form of the pyrometer embodying the invention.

In order to minimize the effect of ambient temperature, the cone and its housing is preferably made of materials which in the related structure will not expand with relation to one another when subjected to a common ambient temperature. For instance, if in Fig. 2, $l_1$ is the effective expanding length of the housing or support for the cone and $l_2$ the axial length of the cone, then in theory I would make $l_1\Delta_1 = l_2\Delta_2$ where $\Delta_1$ and $\Delta_2$ are the linear temperature expansion coefficients of the support and the cone respectively. In order to do this exactly, I may have to select a material for the support having a high value of $\Delta_1$ and reduce its length by inserting in the support a ring of low expansion material, so that as shown in Fig. 3, if $l_4$ represents the length of the inserted ring whose coefficient is $\Delta_4$, and $l_3$ is a length having a coefficient $\Delta_3$, the lengths $l_3$ and $l_4$ would be made such that $l_3\Delta_3 + l_4\Delta_4$ equals the desired value of $l_2\Delta_2$ of the equation $l_1\Delta_1 = l_2\Delta_2$.

In such an arrangement there may be an uncompensated expansion between the support and the cone and the measuring structure. This uncompensated expansion may be compensated for by constructing the measuring system lengths, that is the actuated means of previously described structures, of invar or material having extremely low coefficients of expansion and utilizing the minimum possible lengths in such uncompensated portions.

I may also employ a rubber washer or flexible member as at 29 in Fig. 2 or as shown in Figs. 6 through 12 inclusive, to provide a seal between the cone and the housing to minimize convection therebetween and for other purposes heretofore described.

If in Fig. 2, $l_1$ and $l_2$ are the lengths of the support and cone respectively at some temperature $T_0$ and $\Delta_1$ and $\Delta_2$ are the temperature coefficients of expansion thereof at the temperature $T_0$, and that for some changes of $T_0$, $\Delta_1$ and $\Delta_2$ are substantially constant, then for a change of temperature from $T_0$ to $T_1$, the change of length $\Delta l_1$ in $l_1$ is equal to $l_1\Delta_1(T_0-T_1)$. Similarly the change $\Delta l_2$ is equal to $l_2\Delta_2(T_0-T_1)$. Therefore, for a zero net length change between $l_1$ and $l_2$, $\Delta l_1$ must equal $\Delta l_2$, which is satisfied if $l_1\Delta_1$ equals $l_2\Delta_2$.

A pyrometer constructed as herein described has a systematic linear response to the radiant energy absorbed on the inner surface of the element 1.

In Fig. 15, I have shown a curve which illustrates the elongation of the cone as a function of radiant energy directed on its inner surface by an electrical resistance such as shown in Fig. 14. As indicated by this curve, the departure from linearity is not noticeable until an expansion of almost 0.007" is reached. At this point, the mean temperature difference betwen the cone and support was almost 200° F. I prefer, in general, that the cone be made of metal having high expansion and low thermal conductivity and of thin wall.

If the response of the cone to radiation is linear and if the response of the actuated means thereto is linear, then a recording system which has a linear characteristic will give a linear scale with respect to radiation intensity; thus, a standard logarithmic temperature scale may be used on such a recorder.

As to a form of instrument or pyrometer embodying my invention and which I have tested, I have observed that it lags of the order of thirty seconds, that is, in an interval of thirty seconds the instrument will respond almost completely to a change from one value of radiant energy received to another value of such energy.

In any device, such for example as illustrated by Figs. 2 and 5, the total expansion of the cone required for full range deflection is of the order of 0.004".

The accuracy of the pyrometer embodying my invention is illustrated by Fig. 16, which shows a theoretical temperature scale for a well known type of temperature recorder in wide commercial use, and the test points observed for a calibration run on my pyrometer. As will be seen by inspection of this curve, the observed test points, indicated by heavy dots, fall substantially on the theoretical curve throughout its entire range.

The curve shown in Fig. 15 shows the response of a brass cone and of an aluminum cone. It will be observed that the "up" and "down" curves fall substantially one on the other indicating the degree of accuracy of the device. Curve $Al_1$ was obtained with a device such as indicated in Fig. 14 having an actuated means such as gauge 35. The flange F at the base of cone 1 was insulated from the support by means of a double thickness of thin paper gaskets PG. These gaskets impeded the loss of heat of element 1 by conduction to support 2, consequently the cone temperature was higher for the various values of input to the resistance element than in the case of curve $Al_2$ where the gaskets were not employed on the same device.

The brass cone gave much higher linear response than the aluminum cones, apparently because aluminum has a much higher heat conductivity than brass. Thus the brass cone temperatures were higher since less heat was lost by conduction to support 1.

Having thus described the invention and the principles thereof, it will be apparent to those skilled in the art that various modifications may be made in the forms of embodiment of the invention without departing either from the spirit or the scope of the invention.

What I claim as new and what I desire to claim by Letters Patent is:

1. A radiation pyrometer comprising an elongated hollow member closed at one end and open at the other end whereby radiant energy may be directed on the inner surface of said hollow member, a support surrounding said hollow member, said hollow member being secured at its open end to said support so that it is free to undergo changes in length with corresponding movement of its closed end in accordance with the quantity of radiant energy received on the inner surface thereof, and means supported by said support adjacent the closed end of said hollow member and disposed to be actuated by said hollow member in accordance with its changes in length, said support and actuated means being of metal disposed to have the same total expansion as the hollow member resulting from ambient temperatures whereby the position of the actuated means relative to the closed end of said hollow member remains substantially fixed as the result of ambient temperature and whereby changes in length of said hollow member relative to said actuated means are substantially directly proportional to total radiant energy received on its inner surface.

2. A pyrometer according to claim 1 characterized by the fact that the support is longer than said hollow member, the actuating means is supported by said support and having a portion thereof extending towards the closed end of said hollow member in position to be actuated thereby, the length of said portion being substantially equal to the difference between the lengths of said hollow member and support, the hollow member, support, and the portion of the actuating means extending towards said hollow member being of metal having substantially the same temperature coefficient of expansion whereby the positions of the closed end of the hollow member and the said adjacent portion of the actuating means remain substantially fixed relative to each other for all values of ambient temperature and whereby changes in length of said hollow member available for actuation of said means is proportional to the total quantity of radiant energy received on the inner surface of said hollow member.

3. A pyrometer according to claim 1 characterized by the fact that a fluid cooled housing is provided and adapted to support the pyrometer in the opening in a furnace wall, the end of the housing opposite the open end of said hollow member having an opening therein for the admission of radiant energy to be received on the inner surface of said hollow member.

4. A pyrometer according to claim 1 characterized by the fact that the pyrometer support is adjustably attached to said housing whereby the pyrometer may be adjusted longitudinally thereof to thereby predetermine the distance between the opening in the housing and the open end of said hollow member.

5. A pyrometer according to claim 1 characterized by the fact that the radiant energy receiving member is a hollow cone of sheet metal, the base of which cone is secured to said support.

6. A pyrometer according to claim 1 characterized by the fact that the support surrounding said hollow member is of different length than said hollow radiant energy receiving member and comprises a plurality of tandem connected sections each section being of metal, the metal of one section having a temperature coefficient of expansion so differing from the temperature coefficient of expansion of another section that the overall expansion of said support and of said hollow member are substantially equal when subjected to substantially the same ambient temperature.

7. A pyrometer according to claim 1 characterized by the fact that a flexible member extends across said support between the free end of said radiant energy receiving member and said actuated means whereby movement of said radiant energy receiving member for actuating said actuated means is effected through said flexible member.

8. A pyrometer according to claim 1 characterized by the fact that the actuated means is adapted to effect transmission of a force whose magnitude varies in accordance with changes in length of said hollow member in response to the value of radiant energy received thereby.

9. A radiation pyrometer comprising a hollow member closed at one end and open at the other whereby radiant energy may be directed on the inner surface of said hollow member, the length of said hollow member being not less than about 2.5 times its width at its open end, a support surrounding said hollow member the hollow member being secured to said support adjacent its open end, and means supported by said support adjacent the closed end of said hollow member and disposed to be actuated thereby in accordance with the quantity of radiant energy received by it, said support being of metal disposed to have the same total expansion as the hollow member resulting from ambient temperatures whereby the position of the actuated means relative to the closed end of said hollow member remains substantially fixed, and whereby changes in length of said hollow member relative to said actuated means are substantially directly proportional to total radiant energy received on its inner surface.

10. A pyrometer according to claim 1 characterized by the fact that the radiant energy receiving member has a flange at its open end attached to said support, the radiant energy receiving member being spaced from said support at all points between said flange and its closed end.

11. A pyrometer according to claim 1 characterized by the fact that the support is spaced from said radiant energy receiving means throughout the length of the latter, that the support member has a relatively thick wall and high heat storage capacity compared to that of the radiant energy receiving member, and that the metal of said support has a relatively high thermal conductivity and the radiant energy receiving member has a temperature coefficient of expansion substantially equal to that of the support but has a thermal conductivity substantially less than that of the support.

12. A pyrometer according to claim 1 characterized by the fact that the ratio of the thickness of the metal of said hollow member to that of the thickness of the wall of said support is in the range of about 1:20 to 1:200.

13. A pyrometer according to claim 1 characterized by the fact that the thickness of the metal of said hollow member is of the order of 0.003 inch and the thickness of the wall of said support is at least 0.06 inch.

14. A pyrometer according to claim 13 characterized by the fact that the ratio of thickness of the metal of said hollow member to the thickness of the wall of said support is in the range of about 1:20 to about 1:200.

15. A pyrometer according to claim 9 characterized by the fact that the thickness of the metal of said hollow member is of the order of about 0.003 inch and that of the wall of said support is at least 0.0625 inch.

16. A pyrometer according to claim 1 characterized by the fact that the radiant energy receiving member is a hollow cone of sheet metal, the base of which is secured to said support, and that the thickness of the cone is of the order of about 0.003 inch and that the thickness of the wall of the support is of the order of at least 0.06 inch.

17. A pyrometer according to claim 1 characterized by the fact that the radiant energy receiving member is a hollow cone of sheet metal, the base of which is secured at one end of said support, and that the thickness of the cone is of the order of about 0.003 inch and that the thickness of the wall of the support is of the order of at least 0.06 inch.

18. A pyrometer according to claim 1 characterized by the fact that the radiant energy receiving member is a hollow cone of sheet metal, the base of said cone being formed with a flange which is secured to one end of said support, and that the thickness of the cone is of the order of about 0.003 inch and that the thickness of the wall of the support is of the order of at least 0.06 inch.

19. A pyrometer according to claim 1 characterized by the fact that the radiation responsive member is a hollow cone having a cone angle of not less than about 9° and not more than about 30°.

20. A pyrometer according to claim 1 characterized by the fact that the radiation responsive member is a cone having a metal thickness not less than about 0.003 inch, and a ratio of length to diameter of the base of the cone of about 2.5:1 to 6:1.

21. A pyrometer according to claim 1 characterized by the fact that means are provided to reduce the rate of loss of heat by conduction from the radiant energy responsive member to the support at its point of attachment thereto.

22. A radiation pyrometer comprising an elongated hollow radiant energy responsive member, said member being closed at one end and open at the other, an elongated hollow support within which said elongated hollow member is substantially confined, said hollow member being secured at one end to said support with the opposite end free to move and so mounted therein that radiant energy may be directed through its open end to impinge on the inner surfaces thereof, and means supported by said support and disposed to be actuated by the free end of said radiant energy responsive member as its length changes with the total quantity of radiant energy received on its inner surface, said support and actuated means being of metal disposed to have the same total expansion as the hollow member resulting from ambient temperatures whereby the position of the actuated means relative to the free end of said hollow member remains substantially fixed as the result of ambient temperature and whereby changes in length of said hollow member relative to said actuated means are substantially directly proportional to total radiant energy received on its inner surface.

23. A pyrometer according to claim 22 characterized by the fact that the radiant energy responsive member is a hollow cone of sheet metal whose length is at least about 2.5 times its diameter at the base.

ALFRED A. MARKSON.

REFERENCES CITED

The following references are of record in the file of this patent:

UNITED STATES PATENTS

| Number | Name | Date |
|---|---|---|
| 830,845 | Peterson | Sept. 11, 1906 |
| 1,109,174 | Peterson | Sept. 1, 1914 |
| 1,765,056 | Cunningham | June 17, 1930 |
| 1,844,451 | Watson | Feb. 9, 1932 |
| 1,991,152 | Hickman | Feb. 12, 1935 |
| 2,055,922 | Brennen | Sept. 29, 1936 |
| 2,083,317 | Dallenbach | June 8, 1937 |
| 1,109,880 | Dow | Mar. 1, 1938 |
| 2,191,640 | Beveridge | Feb. 27, 1940 |
| 2,332,212 | Fillo | Oct. 19, 1943 |
| 2,374,431 | Higley | Apr. 24, 1945 |